United States Patent [19]
Schnacke

[11] Patent Number: 5,966,830
[45] Date of Patent: Oct. 19, 1999

[54] WASHING AND DRYING APPLIANCE FOR SALADS AND DELICATE FRUITS

[76] Inventor: Bernard Ulrich Schnacke, 1920 Center Park Dr., Charlotte, N.C. 28217-2901

[21] Appl. No.: 09/210,546

[22] Filed: Dec. 14, 1998

[51] Int. Cl.[6] .................................................. F26B 17/24
[52] U.S. Cl. .................................. 34/58; 34/319; 34/322; 99/511; 210/380.1
[58] Field of Search ............................... 34/58, 312, 318, 34/322, 323, 319; 99/495, 511; 210/360.1, 380.1, 781, 784

[56] References Cited

U.S. PATENT DOCUMENTS

| | | |
|---|---|---|
| 3,753,297 | 8/1973 | Mantelet ..................................... 34/58 |
| 4,103,432 | 8/1978 | Dieterich et al. ........................... 34/58 |
| 4,189,850 | 2/1980 | Dieterich et al. ........................... 34/58 |
| 4,493,156 | 1/1985 | Siegmann .................................... 34/58 |
| 4,742,624 | 5/1988 | Grant ........................................... 34/58 |
| 4,756,169 | 7/1988 | Pignal et al. ................................ 68/23 |
| 5,054,209 | 10/1991 | Koff ............................................. 34/58 |

*Primary Examiner*—Henry Bennett
*Assistant Examiner*—Pamela A. Wilson
*Attorney, Agent, or Firm*—Laurence R. Brown

[57] ABSTRACT

A centrifugal force salad green spinning system is improved for use with delicate fruits and vegetables such as strawberries and delicate herbs by inserting a secondary receptacle basket with reduced diameter sidewalls into the primary rotary spinning receptacle basket thereby to reduce the magnitude of centrifugal force exerted upon contents of the secondary receptacle basket.

8 Claims, 1 Drawing Sheet

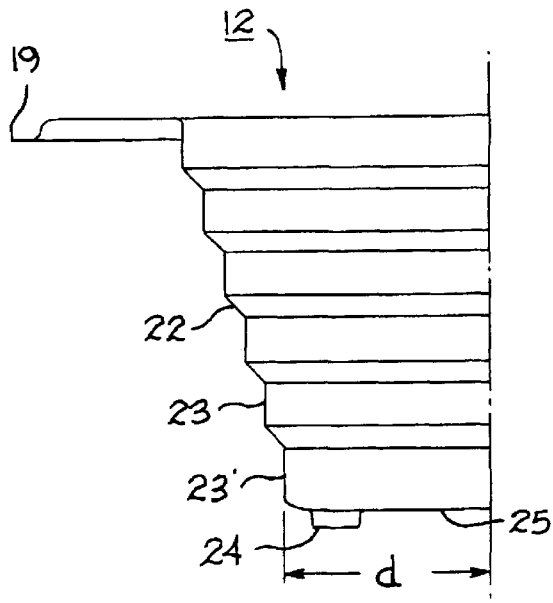
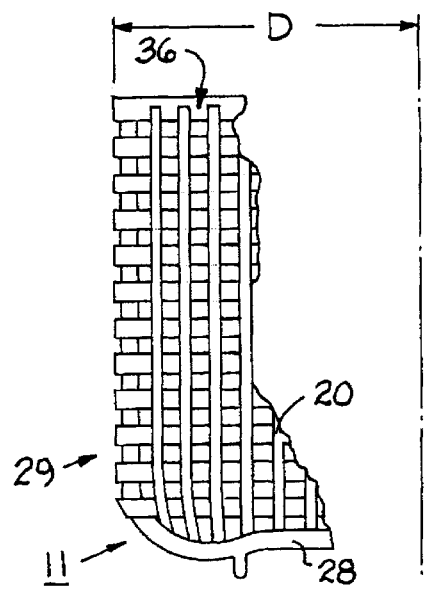
FIG. 4
FIG. 3
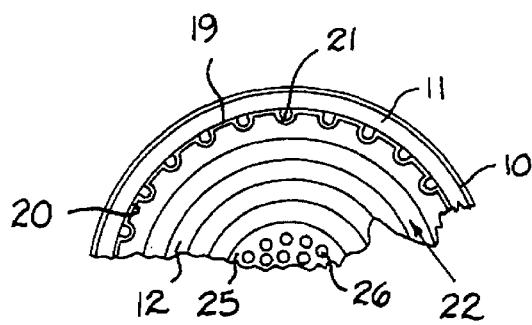
FIG. 1
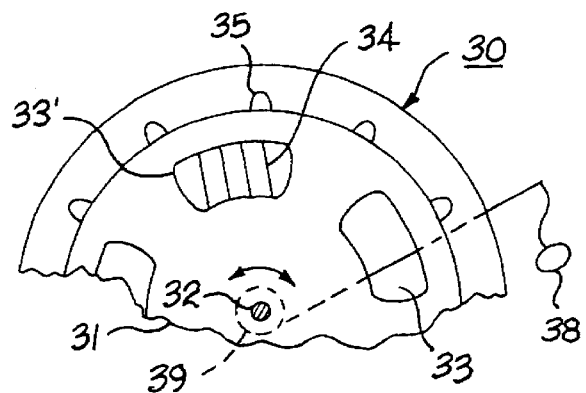
FIG. 2

WASHING AND DRYING APPLIANCE FOR SALADS AND DELICATE FRUITS

TECHNICAL FIELD

This invention relates to centrifugal spinners that wash and dry salad greens and more particularly it relates to such spinners capable of washing and drying both salad greens and more delicate produce such as herbs and berries.

BACKGROUND ART

Centrigual salad spinners are well known in the art and are commercially available, for example, under the brand name "EMSA" produced by Emsa Werke Wulf GmbH, of Emsdetten, Germany. Such salad spinners serve the function of removing excess water from washed salad greens. Some such salad spinners both wash and dry the salad greens. These spinners in general have an inner basket rotatably nested in an outer container for spinning by means of a motor or hand manipulated flywheel assembly, as illustrated by U.S. Pat. No. 5,054,209 W. Koff, Oct. 8, 1991.

For effectively removing water from salad greens, a considerable amount of centrifugal force is necessary. Thus, these spinners in the prior art have been deficient in the processing of delicate greens such as herbs and other salad ingredients such as berries which become crushed or damaged by broken skins under the influence of the high centrifugal forces encountered.

It is therefore an objective of this invention to produce salad spinners that are able to remove excess water from washed produce including both conventional salad greens and delicate produce such as herbs and berries that would be crushed or damaged in conventional spinners.

DISCLOSURE OF THE INVENTION

This invention in a preferred embodiment provides a washing and drying centrifugal spinner system that processes salad greens in a conventional manner having a removable insert basket for processing more delicate produce including berries and herbs in a manner preventing crushing and the breakage of the outer skin.

This is achieved by attaching nested inside a conventional salad spinner rotatable basket a removable inner basket assembly with a smaller diameter than the salad spinner basket to rotate therewith. The significantly smaller centrifugal force encountered in the additional inserted basket thus effectively slings off excess water without crushing or damaging more delicate produce.

Other features, objectives and advantages of the invention will be found throughout the following description, drawings and claims.

BRIEF DESCRIPTION OF THE DRAWINGS

In the accompanying drawings, wherein like reference characters relate to similar features in the different views in order to facilitate comparison:

FIG. 1 is a top fragmental view of a centrifigal salad spinning nest of container receptacles embodying the invention, looking downwardly with the top cover and its accompanying spinning assembly removed;

FIG. 2 is a bottom fragmental view of the top cover and incorporated spinning mechanism;

FIG. 3 is a fragmental sectioned side view sketch of the outer rotatable salad spinning container sub-assembly shown in FIG. 1; and FIG. 4 is a fragmental cut-away side view of the inner rotatable salad spinning container sub-assembly shown in FIG. 1.

THE PREFERRED EMBODIMENT

Looking down into the uncovered concentrically oriented receptacle baskets of FIG. 1, it is seen that the outermost receptacle basket 10 is a substantially cylindrical cup-shaped member with solid, water proof walls, typically of a durable plastic material similar to that of the other nested baskets 11 and 12. This outermost receptacle basket 10 functions to journal the primary salad receiving substantially cylindrical cup-like intermediate produce container basket 11 for rotation. That intermediate basket 11 has sieve-like walls (29, FIG. 3) for passing outwardly surplus surface water gathered on the salad greens when washed by means of centrifugal force as that basket rotates. The outermost basket 10 then drains the water out of bottom discharge vents, usually into a sink where the spinner system sets when in use.

The innermost basket 12 is removably nested and retained by gravity within the wall 29 of the intermediate basket 11 and is keyed therewith for concurrent rotation. In this embodiment, the spaced vertical ribs 20 on the inner wall of the intermediate basket 11 mate with corresponding notches 21 extending inwardly from the outer rim 19 of the innermost basket 12 to assure simultaneous rotation of both the intermediate and innermost baskets 11, 12. The innermost basket 12 has solid water-proof pyramid-like inverted stepped walls with tapered ledges 22 and vertical risers 23 as better seen in FIG. 4. This basket 12 has lift tabs 24 extending downwardly from the bottom 25 to keep the bottom 25 spaced above the bottom 28 of the contiguous intermediate basket 11, thereby letting water drain through the sieve-like bottom wall 26 for disposal by centrifugal force through the vented sidewalls 29 and from there out the bottom of the outermost basket 10 into the resident sink.

Now, looking into the bottom side of the cover assembly 30, the flywheel 31 is rotatably mounted upon axle 32 for turning in either direction. Spaced apertures 33 extend through the flywheel and the aperture 33' is shown in registered position with a corresponding aperture in the generally solid closed cover plate as noted by the vertical mesh lines 34. The apertures 33 by passing running water through the spinning assembly while the flywheel rotates thus permits the system to both wash and dry contents of the inner baskets 10, 11 during rotation as water from a registered spigot in the sink is opened during a wash spinning cycle and is closed for a drying cycle.

The flywheel 31 has radially extending ribs 35 mate into the gaps 36 between ribs 20 at the top of the intermediate basket 11 seen in FIG. 3. Thus, when the string 38 is manually pulled from a wound up position about a drum 39 concentric with the pivot shaft 32 the flywheel 31 and two coupled inner rotatable baskets 11, 12 simultaneously rotate to sling water centrifugally outwardly through the sieve-like walls 29 of intermediate basket 11. The water intercepted by the solid walls of innermost basket 12 drains down the sidewalls and is thus passed through the intermediate basket 11 sidewall 29. From there this water passes downwardly into the sink as it hits the solid sidewall of the outermost basket 10. Since the innermost basket 12 is removable, the intermediate basket 11 may be rotated.

A typical diameter of the outer rotary basket 11 is about 8.5 inches compared with an inner rotary basket 12 with the lowermost step sidewall riser diameter of about 4.25 inches while other risers 23 progress in upward steps to about 6.5 inches in diameter. The cylindrical height of the outer basket 10 is approximately 6 inches.

It is thus seen that with the innermost basket 12 of a significantly shorter diameter, typically about half the diameter of the outer basket 11, the lowermost cup of the innermost basket 12 formed by sidewall riser 23' can contain strawberries, which are more delicate than usual salad greens, and which are thereby exposed to a force typically only about one half the centrifugal force at the riser wall 23' as is encountered at the outer basket 11 wall 29, which would tend to crush the strawberries undergoing high velocity rotation.

With the stepped wall structure of the innermost compartment 12, it is recognized that heavier, more dense items will lie at the bottom, and thus blueberries for example will settle to the bottom when mixed in the innermost container 12 with overlying herbs or other lighter produce which can undergo more force in the drying process.

Having therefore advanced the state of the art with an improved centrifugal force produce washing and drying system, those features of novelty representative of the spirit and nature of the invention will be defined with particularity in the following claims.

I claim:

1. A centrifugal vegetable and fruit spinning assembly for removing surface water from wet produce, comprising in combination, an outer produce container open top stationary receptacle basket and concentrically nested open top inner basket rotatable in the outer receptacle basket, said inner basket having a structure for centrifugally slinging water from produce such as salad vegetables into the outer receptacle basket for disposal therefrom, a second open top innermost basket of shorter diameter than the first said inner basket residing non-rotatably and removably in the first said inner basket, said innermost basket having structure for centrifugally removing surface water from delicate fruits and vegetables for discharge into said outer receptacle basket, a cover spanning the open-top of said outer basket, and rotational means for simultaneously rotating the two inner baskets in a first mode of operation and independently rotating the outer one of the two inner baskets in a second mode of operation.

2. The spinning assembly of claim 1 wherein the first said inner basket has substantially cylindrically shaped sidewalls with sieve-like structure for passing water centrifugally through the sidewalls when produce is rotated therein.

3. The spinning assembly of claim 1 wherein the second said inner most basket comprises interlocking structure to position it non-rotatably within the first said inner basket.

4. The spinning assembly of claim 1 wherein the second said inner most basket has solid sidewalls and a sieve-like bottom wall for passing water out of that second inner most basket.

5. The spinning assembly of claim 1 wherein the second said inner most basket has an inverted pyramid sidewall structure with a plurality of slanting ledges between succeedingly smaller diameter lower sidewall circumferential risers, thereby forming a set of circumferential riser rings of increasing diameter from lower to upper circumferential rings.

6. The spinning assembly of claim 1 wherein the rotational means comprises a spinning flywheel mounted in said cover to interlock rotationally with the first said inner basket.

7. The spinning assembly of claim 1 further comprising produce washing means for running water through the spinning assembly when rotating.

8. In a spinning assembly for removing surface water from produce by centrifugal force rotation of an inner basket containing the produce within an outer container, the improvement comprising a removable insert receptacle basket for holding delicate produce positioned within said inner basket for rotation therewith and having an outer wall of significantly less diameter than that of the inner basket for reduction of the centrifugal force exerted upon contents rotated in the insert receptacle basket.

\* \* \* \* \*